No. 891,391.  PATENTED JUNE 23, 1908.
P. ABBOTT.
PHOTOGRAPHIC DEVELOPING APPARATUS.
APPLICATION FILED OCT. 26, 1906.
2 SHEETS—SHEET 2.
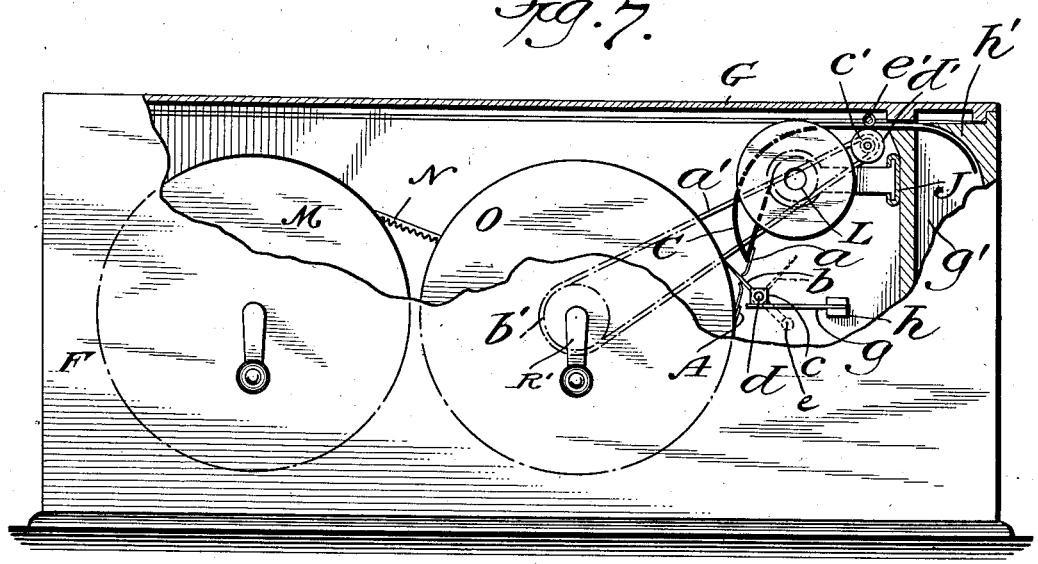
Witnesses
Inventor
Phillips Abbott

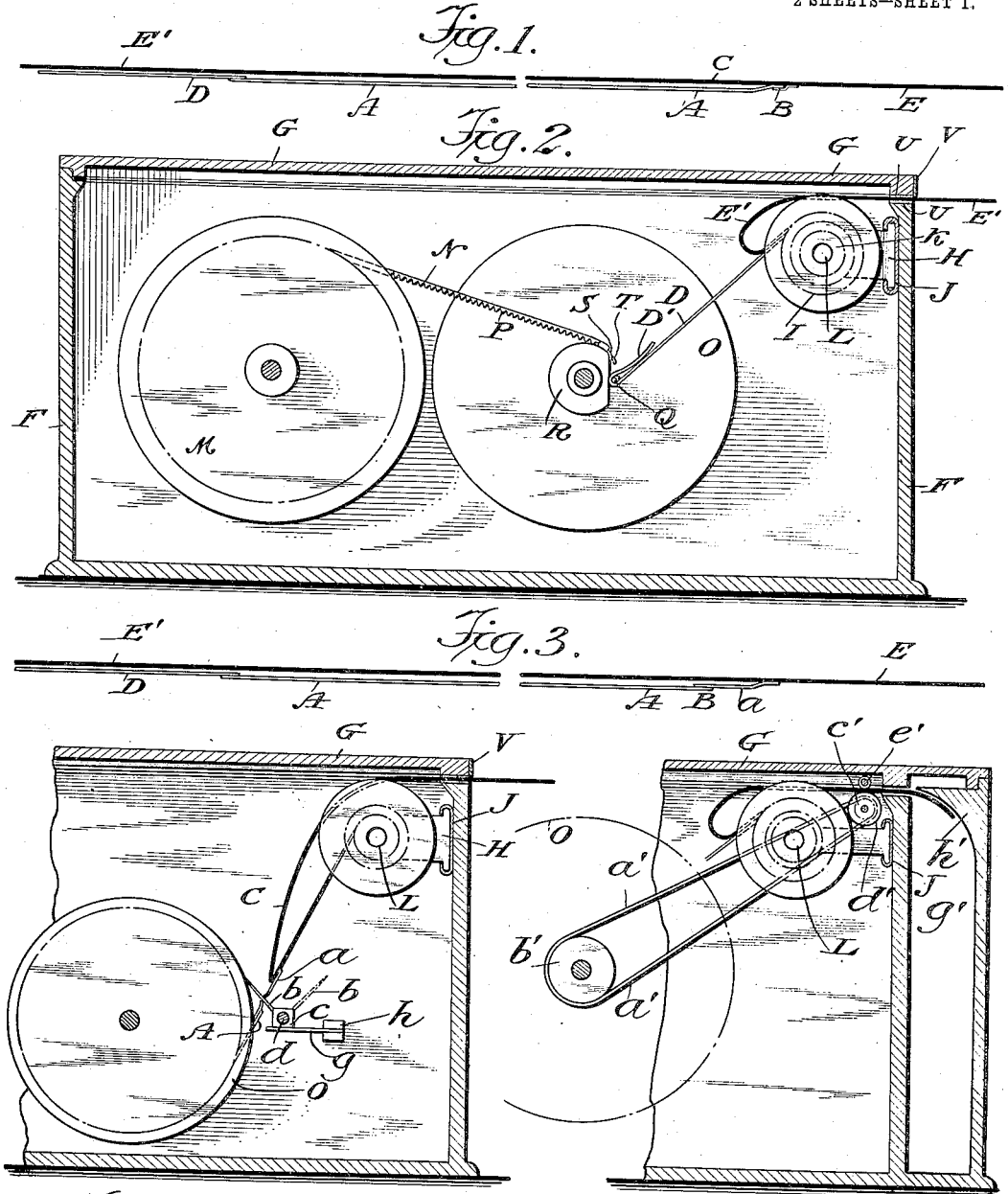

UNITED STATES PATENT OFFICE.

PHILLIPS ABBOTT, OF OYSTER BAY, NEW YORK.

PHOTOGRAPHIC DEVELOPING APPARATUS.

No. 891,391.　　　　Specification of Letters Patent.　　　Patented June 23, 1908.

Application filed October 26, 1906. Serial No. 340,644.

*To all whom it may concern:*

Be it known that I, PHILLIPS ABBOTT, a citizen of the United States, and a resident in the town of Oyster Bay, Nassau county, State of New York, have invented a new and useful Improvement in Photographic Developing Apparatus, of which the following is a specification, reference being had to the accompanying drawings, in which—

Figure 1 illustrates an edgewise view of an unrolled flexible photographic cartridge film, together with its protective opaque material, or black paper; Fig. 2 illustrates a vertical longitudinal sectional view of the invention embodied in a well known form of daylight developing apparatus, parts of the latter being omitted, and parts shown in elevation; Fig. 3 illustrates a view similar to Fig. 1, of a modified construction of flexible photographic film, with protective opaque material; Fig. 4 illustrates a vertical longitudinal sectional view of the invention embodied with a part of the day-light developing devices and showing cut-off mechanism for separating the opaque material from the sensitized film; certain parts being shown in elevation; Fig. 5 illustrates an elevation of one form of severing device for separating the opaque material from the sensitized film; Fig. 6 illustrates a form of the invention in which the opaque material is automatically conducted from the interior of the developing machine to its exterior, showing also a receptacle for the discarded opaque material, certain parts being shown in elevation. Fig. 7 illustrates an elevation of one form of developing apparatus embodying the invention, the side presented toward the observer being partly broken away the better to disclose the interior devices. In this figure all of the devices referred to herein are assembled and illustrated in their co-active arrangement.

Flexible photographic film adapted to receive a series of exposures and wound upon a spool having flanges at its ends and with an opaque protective covering, are now universally known and used under the name of photographic film cartridges.

The developing, washing and fixing of exposed film cartridges have, until recent years, been carried on in the usual photographic dark room, preparatory to which the photographic film has been separated from the opaque material. Thus the exposed film alone has been subjected to the operation of the developing, washing and fixing baths.

In recent years so-called daylight developing machines for film cartridges have been invented and extensively used, in which the exposed film having been suitably connected with the opaque material at its then leading end, was placed with the opaque material in a suitable light-tight receptacle and both together unwound from the flanged receiving spool, upon which they were wound in the camera during exposure. Thus both the film and the opaque material were submerged or brought in contact with the chemical fluids necessary for photographic developing, washing and fixing. These daylight developing machines are at the present time used in large numbers, but their employment is attended with some serious disadvantages, among them the following: The opaque protective material, which has been necessarily submerged in, or at least subjected to the operation of the chemical baths, absorbs and thus wastes a large percentage of the baths; likewise the washings from it injuriously affect the quality of these baths, so that they quickly become unsuited for further use. Attempts have heretofore been made to obviate these difficulties by the removal of the opaque material, thus subjecting the exposed sensitized material alone to the action of the chemical baths, but so far as I am aware, all such attempts have been so objectionable for one reason or another, that their use has not been generally adopted.

United States Letters Patent, Number 832,460 dated October 2, 1906, have been granted for an improvement in film cartridges, in which a leading strip of considerable length has been attached to the free end of the film which is used to lead the film through the developing, etc., baths, being connected with the mechanism of the developing machine without employing the opaque material at all for this purpose, and also without danger of exposing any part of the sensitized material to the action of light.

In the drawings hereof I illustrate one form only in which the invention may be embodied and they do not illustrate all the well known details of a daylight developing apparatus, but only such as are useful for an understanding of this present invention.

Referring first to Figs. 1 and 2, A represents the sensitized film. It is attached at one end, as at B, to the opaque protective material C. D is the leading strip for the film A attached to its normally free end, whereby it is unwound and passed through the developing machine. The opaque material C projects beyond the ends of the film proper, as shown at E, E'. The leading strip D need not necessarily be so long as the projecting end of the opaque material, although I prefer it to be substantially as long.

Referring now to Fig. 2, F is the box or tank of the developing machine, provided with a cover G, which is adapted to make light-tight connection with the box. It may be hinged or not, as preferred.

H is one of the supports for the cartridge spool I. These supports are, as is well understood, adapted to lateral adjustment by means of the supporting slideway J, to accommodate spools of different lengths.

K is the spool center and L is the axis upon which the spool rotates.

M is the storage reel for the apron N.

O is the reel upon which the apron, together with the film, is wound for the purpose of subjection to the developing, washing and fixing baths, either within the box F, or being removed therefrom, within a separate submerging tank or vessel, as the case may be. This reel is rotated by a crank R' (see Fig. 7), the crank being on the outside of the box, as shown, and the reel removable by withdrawing the crank as in a well known form of developing machine.

The apron which I have elected to show is of a type commonly used in one well known form of daylight developing apparatus, in which the wound film is to be transferred to a tank adapted to contain the liquids. Any suitable equivalent for that shown may, however, be employed, the specific construction of which will obviously vary, depending upon whether the film is to be developed in the same box or be transferred to a separate vessel or tank. The apron N illustrated in Fig. 2 is provided with corrugated edging strips P, which effect the desirable separation between its convolutions and also permit the free circulation of the developing, washing and fixing fluids. The film during the act of winding is deposited within the volute-like chamber between the several convolutions or layers of the apron in a manner well understood.

Q is a bar, or equivalent device, connected to the center R of the reel O, beneath which bar the end D' of the leading strip D is held in a manner well known. The apron is provided on its front end with loops S adapted to be hooked over bent pins T set in the center R, thus upon the rotation of the reel O, the apron and film are simultaneously wound upon that reel.

The end E' of the opaque protective material has, as shown in Fig. 2, been bent upwardly and outwardly over the upper edge of the adjacent end of the box, projecting beyond the same. The cover G is now applied upon the box and secured in place in any suitable manner, with any suitable fastenings. Where it engages however with the upwardly presented edge of the box, across which the opaque material E' extends, both the cover and the edge of the box are provided with soft, compressible, light-excluding material U. This may be lamb's wool, soft plush, or the like and the area or width of these surfaces is made sufficient to fully exclude light; and I prefer to make the light-excluding material black, or at least dark in color. It should be sufficiently soft and compressible to completely exclude light at the edges of the strip of opaque material, irrespective of the width of the latter.

V is a strip of metal which I prefer to attach to the end of the cover, as shown, so that if desired, the opaque material may be readily and conveniently torn off across its edge.

The operation is as follows: The leading strip D having been connected with the center of the reel O, as shown, or in any other suitable manner, and the end of the apron having likewise been connected to the same center, and the opaque material having been turned outwardly, so that its end projects beyond the side of the box F, the reel O is rotated in any suitable manner, thus winding up upon it the apron N and the leading strip D at first and afterwards the sensitized film A, the leading strip and the film lying loosely in the continuous chamber made between the volutes or coils of the apron in a manner well understood, and during this winding operation, the operator pulls outwardly the opaque material so that it is not wound upon the reel O, on the contrary, it is stripped backwardly and removed from the interior of the box as the winding proceeds, until finally the point of attachment between the film and the opaque material, shown at B in Fig. 1, is reached. At this point, if suitable strain be applied upon the opaque material, the attachment between it and the end of the film will be ruptured, thus freeing the projecting end E of the opaque material which may then be drawn outwardly from the apparatus and cast aside, leaving the end of the film to be wound upon the reel O; or if the attachment between the opaque material and the film shall prove so firm that there is danger of rupturing the film, then the opaque material being pulled out as far as possible, it may be torn off across the edge of the metallic strip B, or otherwise severed, whereupon further turning of the reel O will draw the small remnant of the opaque material back again into the box which together with the terminal portion E thereof will be wound upon the reel O. Thereupon the developing, etc., of the exposed film may be effected by supplying the box F with the appropriate photographic baths, or by removing the reel O with the apron and film and terminal piece therefor to be submerged in a separate tank or vessel adapted to contain the baths.

It will be noted that since the leading strip D may be made of material which is not impregnated with coloring matter and which is chemically neutral to the photographic baths and since it and the film are the only materials interwound with the apron, provided the described separation between the film and the opaque material has been effected, there will be no absorption and consequent waste of the baths, nor any degradation of them by reason of washings from the opaque material, there being none present; and even if the separation referred to has not been effected, nevertheless a small part only of the opaque material, as compared with that ordinarily present, will be brought in contact with the baths and thus there will be a substantial saving and improvement even in this event.

In order that the opaque material may be disconnected from the sensitized film with absolute assurance, so that no part of it shall be brought in contact with the baths, I provide the devices shown in Figs. 3, 4, 5 and 6, which are as follows: The parts generally are, or may be the same as above described, and therefore the same reference letters apply. The film A, however, is preferably in this instance connected to the opaque material at the point B by a somewhat elongated attaching strip $a$ of paper or equivalent material, which may advantageously be an inch or more in length, so that when the film has been nearly all wound upon the reel O, this attaching strip $a$ will be adjacent to a cutter $b$, which may beneficially be set in a squared bar $c$ mounted upon a shaft or suitable bearings $d$, provided with a crank $e$ (see Fig. 5) on the exterior of the box. The cutter $b$ may be as shown in Fig. 5, in which the cutting edge is composed of a series of sharp pointed and preferably sharp sided projections or points $f$. A relatively stiff spring $g$ supported in a suitable support $h$, engages with the flattened sides of the knife supporting bar $c$, so that when in one position, this spring will tend to press the knife against the attaching strip $a$, thus inducing the penetration of the points $b$ through it and when by the appropriate action of the crank $e$, the cutter is tipped backwardly out of the way, as shown in dotted lines in Fig. 4, then the spring $g$ engaging with an adjoining, but different side of the squared axis, will tend always to hold the cutter in its retracted position, so that no accidental engagement with the film will be possible. The operation of this part of the apparatus is obvious; that is to say, when the film has reached the appropriate position; which is readily ascertained by means of the exposure or cutting marks upon the opaque material, as it appears on the outside of the box F, then the crank $e$ being turned, the cutter will be tipped over into operative position, in which its points come in contact with the strip and by reason of the continued pull upon the film as it is wound up and under the action of the spring $g$, the points of the knife will puncture the attaching strip and as the operation continues, it will be completely severed, as indicated in Fig. 4; when the cutter has reached the position there shown, its two outside teeth or end portions will rest upon the flanges of the reel O, and thus the knife will be held from contact with the surface of the apron, so that no injury can result to the latter. After the severance has taken place, the knife will be tipped backwardly and the end of the opaque material, with the remnant of the attaching strip $a$ adhering to it, will be drawn outwardly through the light-tight opening or slit between the box and cover and discarded, whereupon the completion of the winding of the film and of the apron and the development of the film, either within the box, or in a separate tank or vessel, may be effected as before. In this way all of the opaque material is removed and the waste of the baths and their deterioration avoided entirely.

It is not essential that a special attaching strip $a$ should be used in conjunction with the cutter, because I have demonstrated the fact that such a cutter, owing to the readiness with which it penetrates and severs such materials, will readily sever the film alone, or the film and usual paper sticker employed to attach it to the opaque material, or all three together.

In Fig. 6 I show devices whereby the opaque material may be automatically and positively projected from the interior of the box. The device embodies a belt $a'$, which passes over a little pulley $b'$ which is placed preferably on the outside of one of the flanges of the winding reel O, one of which flanges is indicated by the broken line in Fig. 6. The belt passes upwardly over a pulley $c'$ upon the shaft of a feeding roller $d'$ and above this roller is another roller $e'$ which is carried by the cover, so that when the cover is applied to the box, a squeezing contact will be effected between the rollers $d'$ and $e'$, the opaque material lying between them, which, as stated, has been laid outwardly over the roller $d'$ It will be noted that one at least of these rollers should have a yielding face and that the relative size of the pulley $b'$ upon the shaft of the reel O. and that of the pulley $c'$ is such that the latter will run more rapidly than the former, thus effecting a constant pull upon the opaque material, there being necessarily slipping contact between the two when the apparatus is in operation. The action of these rollers as is well understood will be to continuously feed forward the opaque material, thrusting it through the light-tight slit between the cover and the upper edge of the end of the box F. I locate the rollers close to this slit, so that there may be but little length of opaque material between them and the slit, and thus the push upon the opaque material will project it through the slit without its buckling or bending.

The upper roller $e'$ being upon the cover, and the lower one upon the box, the operator is not required to adjust the material between them since they will inevitably be superposed upon one another in the act of placing the cover upon the box.

The pulley $b'$ may be supported in any preferred manner, but in order that the reel O may be removed from the box if the film is to be developed in a separate tank or receptacle, I prefer to attach the pulley to the outside of the flange of the reel, so that it will come away with it, the removable shaft by which the reel is turned running through an opening in the center of the pulley. It will also aid in the convenient manipulation of the parts if the belt $a'$ be of relatively unyielding material, as for instance, a little sprocket chain, because if so when readjusted upon the pulley, upon the return of the reel to the box for further operation, the belt will aid in properly registering the center of the pulley with the bearing for its shaft, whereby the latter may be more conveniently reintroduced.

If the feed rollers above described are used, the necessity for the light-tight slit between the box and the cover may be avoided by adding at the end of the box a chamber $g'$, preferably provided with a deflector $h'$, which will turn the forwardly fed end of the opaque material downwardly into the chamber. In this construction the cover will be continuous, covering this chamber as well as the rest of the box, thus doing away with the light excluding material at the opening between the box and cover.

It will be obvious to those who are familiar with this art that the construction and arrangement of parts above described is one form only of many in which the essentials of the invention may be embodied. I therefore do not limit myself thereto except as required by the scope of the appended claims.

Having described the invention, I claim:

1. A photographic developing apparatus embodying a light-tight casing inclosing a suitably supported apron, a reel within the casing provided with means whereby the apron and a leading strip for the sensitized material may be attached to it, means for the support of a film cartridge likewise within the casing, a cover for the casing provided with an opening between it and the casing through which the opaque material of the cartridges may pass from its interior to its exterior, means to prevent light from entering said opening and means whereby the reel may be rotated from the exterior of the casing.

2. A photographic developing apparatus embodying a light-tight casing inclosing a suitably supported apron, a reel within the casing provided with means whereby the apron and a leading strip for the sensitized material may be attached to it, means for the support of sensitized material and protective material therefor likewise within the casing, a cover for the casing provided with an opening between it and the casing through which the protective material may pass from its interior to its exterior, means to prevent light from entering said opening and means for rotating said reel.

3. A photographic developing apparatus embodying a light-tight casing, a reel within the casing provided with means whereby an apron and a leading strip for the sensitized material may be attached to it, means for the support of the sensitized material and protective material therefor, the casing having an opening through which the protective material may pass from its interior to its exterior, means to prevent light from entering the opening, means to feed the protective material through the opening and means for rotating the reel.

4. A photographic developing apparatus embodying a light-tight casing, a reel within the casing provided with means whereby an apron and a leading strip for the sensitized material may be attached to it, means for the support of the sensitized material and protective material therefor, the casing having an opening through which the protective material may pass from its interior to its exterior, means to prevent light from entering the opening, means to feed the protective material through the opening, means for rotating the reel and means to sever the protective material from the sensitized material.

5. A photographic developing apparatus embodying a light-tight casing inclosing a suitably supported apron, a reel within the casing provided with means whereby the apron and a leading strip for the sensitized material may be attached to it, and the apron and leading strip and the entire length of the sensitized material be wound on the reel, means for the support of sensitized material and protective material therefor, the casing having an opening through which the protective material may pass from its interior to its exterior, means to prevent light from entering the opening, means to sever the protective material from the sensitized material and means for rotating the reel.

6. In a photographic developing apparatus adapted to develop film cartridges, a light-tight casing, a cover therefor, means to support the cartridge, an apron and means to support it, and a shaft about which the apron, the leading strip and in turn the film of the cartridge, are all wound, all of said devices being supported entirely by the casing, part of the casing adjacent to the supports for the cartridge being removed, thus forming an opening through which the protective material thereof may be removed from the interior of the casing by bending it backwardly above the cartridge, whereby it is prevented from coming in contact with the photographic liquids.

7. In a photographic developing apparatus adapted to develop so-called film cartridges, a casing having a light-tight opening through which the protective material of the cartridge may pass and means to positively feed the protective material through said opening.

8. In a photographic developing apparatus adapted to develop so-called film cartridges, a casing having a light-tight opening through which the protective material of the cartridge may pass and a pair of rotating feed rollers adjacent to the light-tight opening adapted to feed the protective material therethrough.

9. In a photographic developing apparatus adapted to develop so-called film cartridges, a casing having a light-tight opening through which the protective material of the cartridge may pass and a pair of rotating feed rollers adjacent to the light-tight opening adapted to feed the protective material therethrough, one of said rollers being upon the body of the apparatus and the other upon its cover.

10. In a photographic developing apparatus adapted to develop so-called film cartridges, means to unwind the exposed film and protective material from the receiving spool of the camera and to wind the film upon a reel located within the apparatus and a cutter pivoted near the line of travel of the film whereby the film will be severed by the swing of the cutter blade across the line of travel of the film.

11. In a photographic developing apparatus, a cutter for severing the film from its protective material, comprising a pivoted blade, the cutting edge whereof is composed of a series of sharp and thin points all having substantially the same length adapted to puncture and cut the material and means on the exterior of the apparatus whereby the cutter may be manipulated.

12. A photographic developing apparatus comprising a single light-tight casing, means therein wholly supported thereby for rotatably supporting a film cartridge, means whereby the entire film may be drawn from the cartridge and all of it coiled in separate convolutions or layers for submission at the same time to a developing bath, the casing having an opening adjacent to the supports for the cartridge through which the protective material may be removed.

13. In a photographic developing apparatus adapted to develop so-called film cartridges, a single casing or box containing means for unwinding the exposed film and its protective material from the cartridge spool and disposing of the entire film in such manner as that it shall be adapted to machine development all at one time in a continuous uncut strip held from contact with itself and means for simultaneously disposing of the protective material by removing the same upwardly and away from the apparatus so that it shall not be subjected to the photographic baths.

14. In a photographic developing apparatus a single casing or box containing means to support an exposed film cartridge and means to protect it from the action of light also means to unroll the sensitized material and the protective material from off the cartridge spool, means within the apparatus to receive and support the film in separated coils or layers for development all at the same time and other means to positively remove the protective material.

15. In a photographic developing apparatus, a casing containing a suitably supported apron, supports for a film cartridge, a rotatable reel provided with means whereby the film of the cartridge and the apron may be simultaneously wound thereon and a light-tight cover so related to the casing that the protective material of the cartridge may be withdrawn from the casing between it and the cover.

16. A photographic developing apparatus embodying a casing adapted to contain the exposed film and devices for supporting and protecting it against contact with itself during development and a cover for the casing and light excluding material between the cover and casing, whereby the protective material of the cartridge may be withdrawn from the casing without admitting light.

17. A photographic developing apparatus embodying a single casing, which alone contains and supports all the devices for supporting and manipulating the cartridge, a cover therefor and light-excluding means between the cover and the casing whereby the protective material of the cartridge being laid outwardly over the edge of the casing the replacement of the cover will enable the protective material to be withdrawn without exposing the film to light.

In testimony whereof I have signed my name to this specification in the presence of two subscribing witnesses.

PHILLIPS ABBOTT.

Witnesses:
JOHN M. LEE,
VINCENT SCULLY.